United States Patent
Auger et al.

(10) Patent No.: US 8,517,324 B2
(45) Date of Patent: Aug. 27, 2013

(54) SAFETY DEVICE FOR CANTILEVERED BEAM AND BOOM ASSEMBLY INCORPORATING THE SAME

(75) Inventors: Paul Auger, Osgoode (CA); James Rempel, Calgary (CA); Matthew Rodgers, Stittsville (CA); Amir Butmir, Kanata (CA); Mark Fletcher, Nepean (CA); Gregory Forrest, Calgary (CA)

(73) Assignee: SMART Technologies ULC (CA)

( * ) Notice: Subject to any disclaimer, the term of this patent is extended or adjusted under 35 U.S.C. 154(b) by 852 days.

(21) Appl. No.: 12/351,112

(22) Filed: Jan. 9, 2009

(65) Prior Publication Data

US 2009/0173867 A1 Jul. 9, 2009

Related U.S. Application Data (63) Continuation of application No. 11/970,593, filed on Jan. 8, 2008, now abandoned.

(51) Int. Cl.
*A47H 1/10* (2006.01)

(52) U.S. Cl.
USPC .......................................... 248/325; 248/324

(58) Field of Classification Search
USPC .................. 353/79, 80; 248/323, 324, 325, 248/331, 123.11, 123.2, 317; 211/94.01, 211/94.03, 88.01, 96, 99, 100, 123, 165, 211/171; 362/430, 427, 457, 458, 147, 404
See application file for complete search history.

(56) References Cited

U.S. PATENT DOCUMENTS

| | | | | |
|---|---|---|---|---|
| 1,319,792 A | * | 10/1919 | Phorson | 248/584 |
| 2,235,720 A | * | 3/1941 | Matarese | 182/222 |
| 2,833,505 A | * | 5/1958 | Dulle | 248/320 |
| 3,280,942 A | * | 10/1966 | Millington | 188/372 |
| 3,385,020 A | * | 5/1968 | Olson | 52/666 |
| 3,417,953 A | * | 12/1968 | Hillquist et al. | 248/284.1 |
| 3,730,587 A | * | 5/1973 | Bloxham et al. | 297/274 |
| 4,210,352 A | * | 7/1980 | Eriksson | 294/81.61 |
| 4,852,842 A | * | 8/1989 | O'Neill | 248/284.1 |
| 4,969,625 A | * | 11/1990 | Singer et al. | 248/662 |
| 5,213,292 A | * | 5/1993 | Evans | 248/123.11 |
| 5,490,655 A | | 2/1996 | Bates | |
| 5,580,091 A | | 12/1996 | Doty | |
| 5,746,404 A | * | 5/1998 | Merko | 248/123.11 |
| 6,056,320 A | | 5/2000 | Khalifa et al. | |
| 6,099,078 A | | 8/2000 | Smithson et al. | |
| 6,312,057 B1 | | 11/2001 | Feile | |
| 6,457,556 B1 | | 10/2002 | Skade et al. | |
| 6,540,366 B2 | | 4/2003 | Keenan et al. | |

(Continued)

OTHER PUBLICATIONS

Transmittal; International Search Report; and the Written Opinion of the International Searching Authority for International Application PCT/CA2009/000003, mailed Apr. 23, 2009.

(Continued)

*Primary Examiner* — Alfred J Wujciak
(74) *Attorney, Agent, or Firm* — Katten Muchin Rosenman LLP (57) ABSTRACT

A safety device for a cantilevered beam pivotally mounted adjacent one end thereof to a support surface is adapted to bridge the beam and the support surface and is structured so that when coupled to the beam and support surface, the safety device maintains the beam in a substantially fixed cantilevered condition until a downward force exceeding a threshold is applied to the beam and thereafter controls downward pivoting of the beam.

20 Claims, 7 Drawing Sheets

(56) References Cited

U.S. PATENT DOCUMENTS

| | | | | |
|---|---|---|---|---|
| 6,964,399 | B1 * | 11/2005 | O'Neill | 248/292.13 |
| 7,770,865 | B2 * | 8/2010 | Shaffer | 248/498 |
| 2003/0177612 | A1 * | 9/2003 | Hayes | 24/16 R |

OTHER PUBLICATIONS

Supplemental European Search Report for European Patent Application No. 09 70 1439 with a completion date of Jul. 15, 2011.

* cited by examiner

SAFETY DEVICE FOR CANTILEVERED BEAM AND BOOM ASSEMBLY INCORPORATING THE SAME

This application is a continuation application of U.S. patent application Ser. No. 11/970,593, filed Jan. 8, 2008, the entire contents of which are incorporated herein by reference.

FIELD OF THE INVENTION

The present invention relates generally to cantilevered assemblies and in particular, to a safety device for a cantilevered beam and boom assembly incorporating the same.

BACKGROUND OF THE INVENTION

Wall mounted cantilevered assemblies such as for example projector mounts are known in the art. U.S. Pat. No. 5,490,655 to Bates discloses a video/data projector and monitor ceiling/wall mount. The wall mount includes a wall support assembly fixedly secured to a wall surface. A pair of struts extends horizontally from the wall support assembly. A projector/monitor adapter is supported by the ends of the struts. The wall support assembly includes a strut adapter that rests between a pair of adapter plates extending from a wall plate. A fastener secures the strut adapter to the adapter plates in a manner to permit rotation of the adapter plate and hence, the struts about a vertical axis. Although Bates discloses an assembly for supporting a projector that is to be secured to a wall surface, the Bates wall mount suffers disadvantages. When a load is placed on the wall mount, the entire load is taken up by the wall mount and the wall surface due to the fact that the wall mount is static. If the load is significant, the load may cause damage to the wall mount and/or the wall surface. In addition, if it is necessary to service the wall mount and/or the projector supported thereon, a ladder or other similar device must be used to gain access to the wall mount and/or projector.

U.S. Pat. No. 6,540,366 to Keenan et al. discloses an overhead projection system comprising an overhead projector support assembly extending generally horizontally from a generally vertical support surface. A display screen having a display surface is mounted on the support surface beneath the projector support assembly. A projector is mounted on the projector support assembly and is aimed to project images onto the display surface of the display screen. The projector support assembly comprises a governor in the form of a damper and spring arrangement to control downward pivotal movement of the projector support assembly when a load is placed on the projector support assembly and to return the projector support assembly to its generally horizontal orientation when the load is removed. Although this overhead projection system has proven to be very effective and overcomes the deficiencies associated with the Bates assembly, it is expensive. In some environments where cost is of primary concern, most cost effective solutions are desired.

It is therefore an object of the present invention at least to provide a novel safety device for a cantilevered beam and to a boom assembly incorporating the same.

SUMMARY OF THE INVENTION

Accordingly, in one aspect there is provided a safety device for a cantilevered beam pivotally mounted adjacent one end thereof to a support surface. The safety device is adapted to bridge the beam and the support surface and is structured so that when coupled to the beam and support surface, the safety device maintains the beam in a substantially fixed cantilevered condition until a downward force exceeding a threshold is applied to the beam and thereafter controls downward pivoting of the beam.

In one embodiment, the safety device comprises first structure to maintain the beam in the substantially fixed cantilevered condition and second structure to control downward pivoting of the beam. The first structure is physically altered when a downward force exceeding the threshold is applied to the beam. In one form, the first structure is at least one elongate link that breaks when the downward force exceeding the threshold is applied to the beam. In another form, the first structure comprises a shear pin and retainer assembly. The second structure comprises at least one beam-pivoting resisting element. The at least one beam-pivoting resisting element may be selected from (i) at least one chain-link element, (ii) at least one spring element, and (iii) at least one dashpot.

According to another aspect there is provided a boom assembly comprising a boom pivotally coupled adjacent one end to a support surface. A safety device acts between the boom and the support surface. The safety device maintains the boom in a substantially horizontal orientation but fails when a downward force exceeding a threshold is applied to the boom to permit the boom to pivot downwardly. After failure, the safety device controls downward pivoting of the boom.

BRIEF DESCRIPTION OF THE DRAWINGS

Embodiments will now be described more fully with reference to the accompanying drawings in which.

DETAILED DESCRIPTION OF THE EMBODIMENTS

Figure 1:
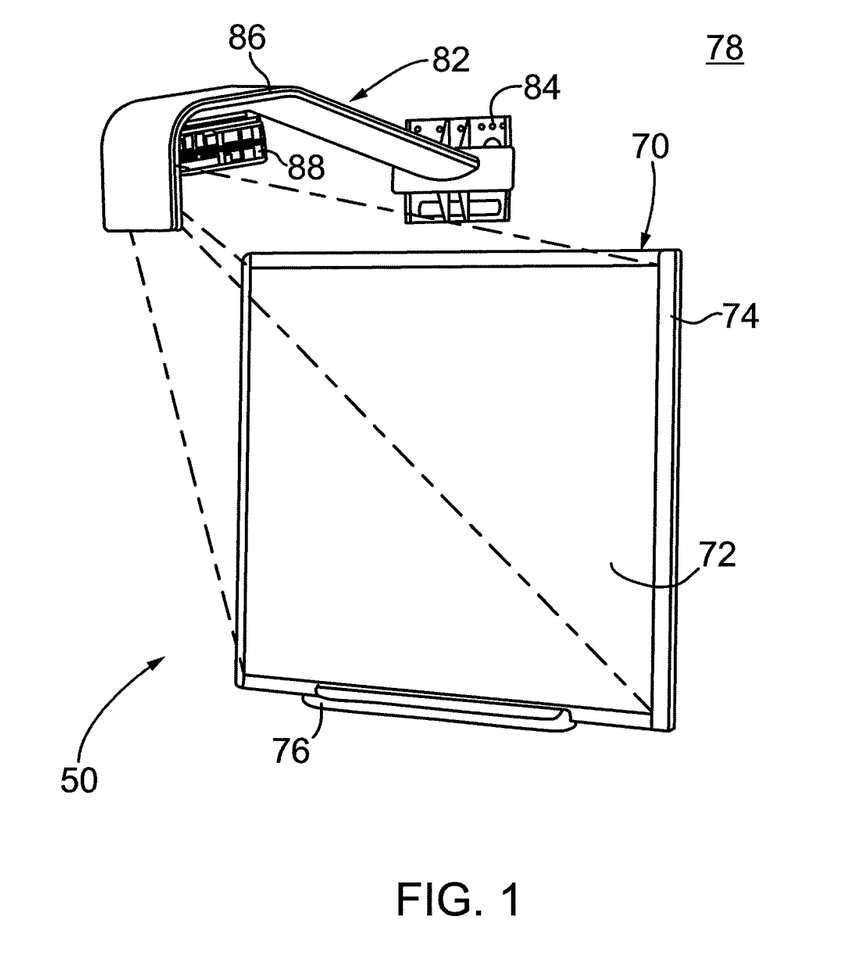
FIG. 1 is a perspective view of an interactive whiteboard and boom assembly.

Turning now to FIG. 1, an interactive whiteboard (IWB) is shown and is generally identified by reference numeral 50. In this embodiment, the IWB 50 is a 600i series interactive whiteboard manufactured by SMART Technologies ULC, of Calgary, Alberta, Canada, assignee of the subject application.

As can be seen, the IWB 50 comprises a touch screen 70 having a touch surface 72 surrounded by a bezel 74. A tool tray 76 is affixed to the bezel 74 adjacent the bottom edge of the touch surface 72 and accommodates one or more tools that are used to interact with the touch surface. The touch screen 70 is mounted on a wall surface 78 via mounting brackets (not shown). The touch screen 70 may be one of a number of types including but not limited to analog resistive, capacitive, camera-based, electromagnetic, surface acoustic wave etc.

A boom assembly 82 is also mounted on the wall surface 78 above the touch screen 70 via a mounting bracket 84. The boom assembly 82 comprises a generally horizontal boom 86 that extends outwardly from the mounting bracket 84. The boom 86 supports a projector 88 intermediate its length and a mirror 89 adjacent its distal end. The projector 88 is aimed at the mirror 89 so that the image projected by the projector 88 is reflected by the mirror 89 back towards the touch screen 70 and onto the touch surface 72.

Figure 2:
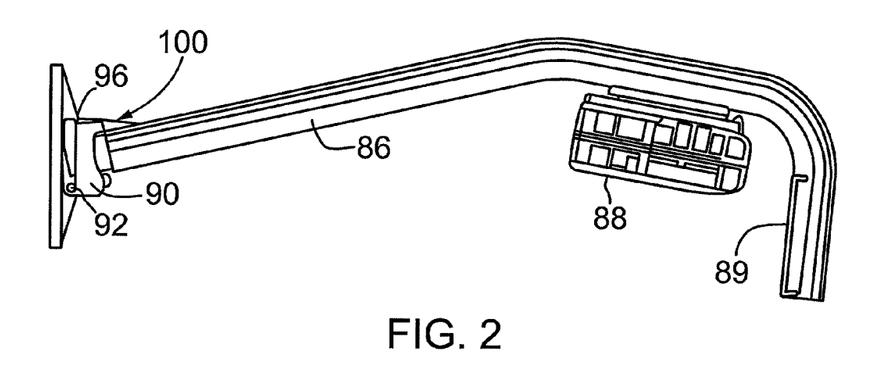
FIG. 2 is a side elevational view in cross-section of the boom assembly.

The mounting bracket 84 comprises a pair of laterally spaced, vertical flanges 90 between which a pivot pin 92 extends. The pivot pin 92 is accommodated by a cup 94 provided on the underside of the boom 86 thereby to enable the boom to pivot downwardly in a vertical plane. The mounting bracket 84 also comprises a horizontal flange 96 that extends outwardly from the mounting bracket above the boom 86. A safety device 100 is secured at one end to the horizontal flange 96 and at its opposite end to the top surface of the boom 86. The safety device 100 maintains the boom 86 in its substantially horizontal orientation unless a downward force exceeding a threshold is applied to the boom 86. If such a downward force is applied to the boom 86, the safety device 100 releases the boom allowing the boom 86 to swing downwardly. In this manner, damage to the wall surface 78 and/or mounting bracket 84 is avoided. Even though the safety device 100 releases the boom 86, the safety device 100 controls downward pivotal movement of the boom to avoid injury to anyone and/or damage to anything beneath the boom 86 as well as to avoid damage to the projector 88 and the mirror 89 supported by the boom 86.

Figure 3:
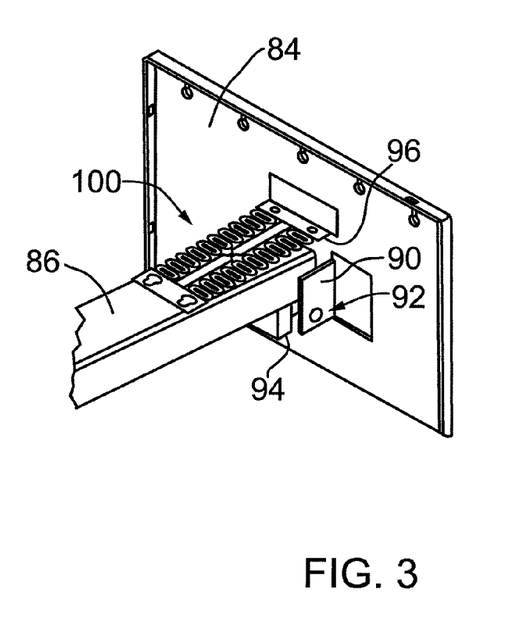
FIG. 3 is an enlarged, partly cut-away, perspective view of a portion of the boom assembly.
Figure 4:
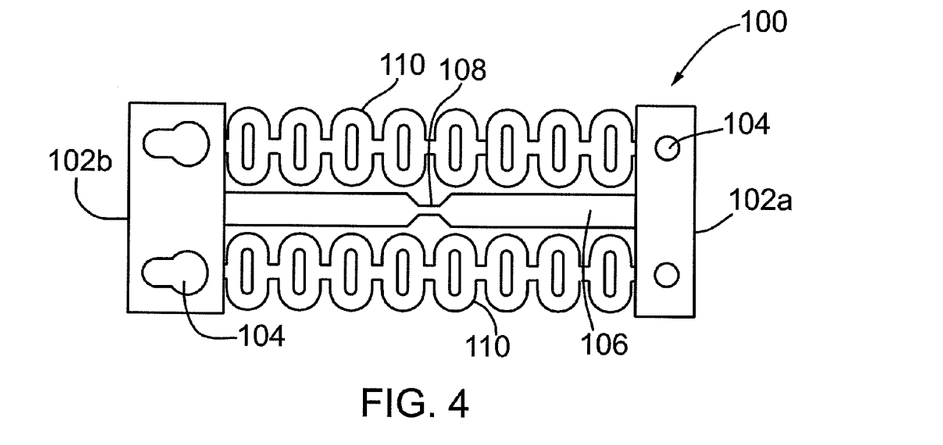
FIG. 4 is a top plan view of a safety device forming part of the boom assembly.

Turning now to FIGS. 2 to 4, the safety device 100 is better illustrated. As can be seen, the safety device 100 in this embodiment is in the form of a metal strap formed of steel or other structurally suitable material comprising a pair of spaced bands 102a and 102b respectively. Each band has pair of laterally spaced holes 104 provided therein. The holes 104 in band 102a accommodate fasteners that secure the band 102a to the horizontal flange 96. The holes 104 in band 102b accommodate fasteners that secure the band 102b to the top of the boom 86. The bands 102a and 102b are joined by a generally central link 106 having a region of weakness 108 midway along its length. The region of weakness 108 in this embodiment is a region of reduced width that acts as a mechanical fuse. A pair of elongate boom-pivoting resisting elements in the form of chain-link elements 110 also joins the bands 102a and 102b. Each chain-link element 110 is positioned on an opposite side of the link 106.

The operation of the safety device 100 will now be described. When the boom 86 is normally loaded, the safety device 100 is placed in tension as the safety device acts to maintain the boom 86 in its horizontal orientation. During normal loading, the integrity of the safety device 100 remains intact keeping the boom 86 in position. However, if the boom 86 is overloaded as a result of one or more individuals pulling down on or hanging from the boom, when the load placed on the boom reaches a threshold, the region of weakness 108 provided along the link 106 fails thereby releasing the boom and permitting the boom 86 to pivot downwardly. Failure of the region of weakness 108 along the link 106 provides clear visual evidence that the boom 86 has been overloaded. The point at which the region of weakness 108 along the link 106 fails is selected to meet safety standard requirements and to avoid damage to the wall surface 78 from occurring as a result of the mounting bracket 84 being pulled from the wall surface 78. In typical applications, the link 106 is designed so that it fails at the region of weakness 108 under an applied load in the range of from about 50 lbs to about 80 lbs. For example, when supporting a typical projector 88, the link is designed so that it fails at the region of weakness 108 under an implied load equal to about 62 lbs.

During downward swinging of the boom 86 under continued application of the applied load and/or under its own weight, the chain-link elements 110 bend while resisting downward pivoting of the boom 86 thereby to control the descent of the boom 86 in a manner to avoid injury to anyone and/or damage to anything beneath the boom 86 as well as to avoid damage to the projector 88 and the mirror 89 supported by the boom 86. As will be appreciated, the configuration of the region of weakness 108 can be tailored to adjust the point at which the link 106 fails under load applied to the boom 86. Also, the configuration of the chain-like elements 110 can be tailored to adjust the manner by which the boom 86 swings downwardly. After failure of the safety device 100, the boom assembly 82 can be reset and returned to its normal operating condition by removing the failed safety device, pivoting the boom 86 upwardly to its generally horizontal orientation, and fastening a replacement safety device 100 to the boom 86 and horizontal flange 96.

Figure 5:
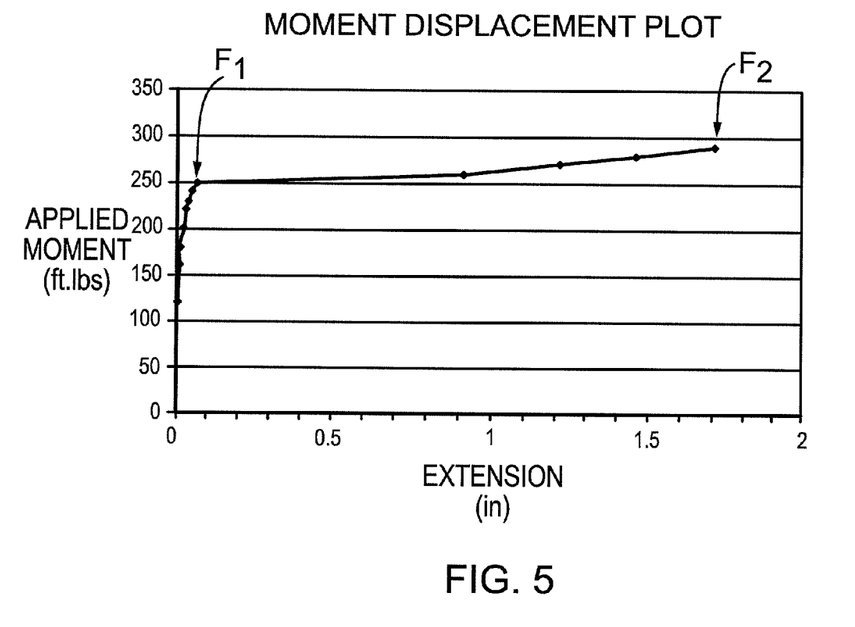
FIG. 5 is a safety device moment displacement plot.

FIG. 5 is a moment displacement plot showing the moment applied to the boom 86 in foot-pounds versus the extension of the safety device 100 in inches. As can be seen, initially as the moment applied to the boom 86 increases, the safety device 100 retains its integrity and extends very little. When the applied moment reaches the threshold, the region of weakness 108 along the link 106 begins to fail and the safety device 100 extends. Point $F_1$ represents the point at which the region of weakness 108 fails under the applied moment. Once the region of weakness 108 fails, the chain-link elements 110 extend as the boom 86 pivots downwardly. Point $F_2$ represents the point at which the chain-like elements 110 fail under the applied moment.

If desired, the link 106 can be configured so that rather than breaking, the link stretches to a point beyond recovery when the boom 86 is subjected to a load exceeding the threshold. Also, the region of weakness 108 along the link 106 can take other forms. For example, the region of weakness 108 can be formed by perforating the link 106. Alternative safety device configurations are also possible.

For example, although the safety device 100 is shown as including a single link 106 positioned between a pair of chain-link elements 110, those of skill in the art will appreciate that many variations are permissible. The safety device 100 may include a single link 106 and a single chain-link element 10. Alternatively, the safety device 100 may comprise a single chain-link element 110 and a plurality of links 106 or a plurality of both chain-link elements 110 and links 106. When the safety device 100 comprises a plurality of chain-link elements 110 and a plurality of links 106, the links and chain-link elements can be arranged in an alternating pattern or other desired arrangement. Of course other structure can be used to maintain the boom 86 in its horizontal orientation and control downward pivoting of the boom 86 after the boom has been overloaded.

Figure 6:
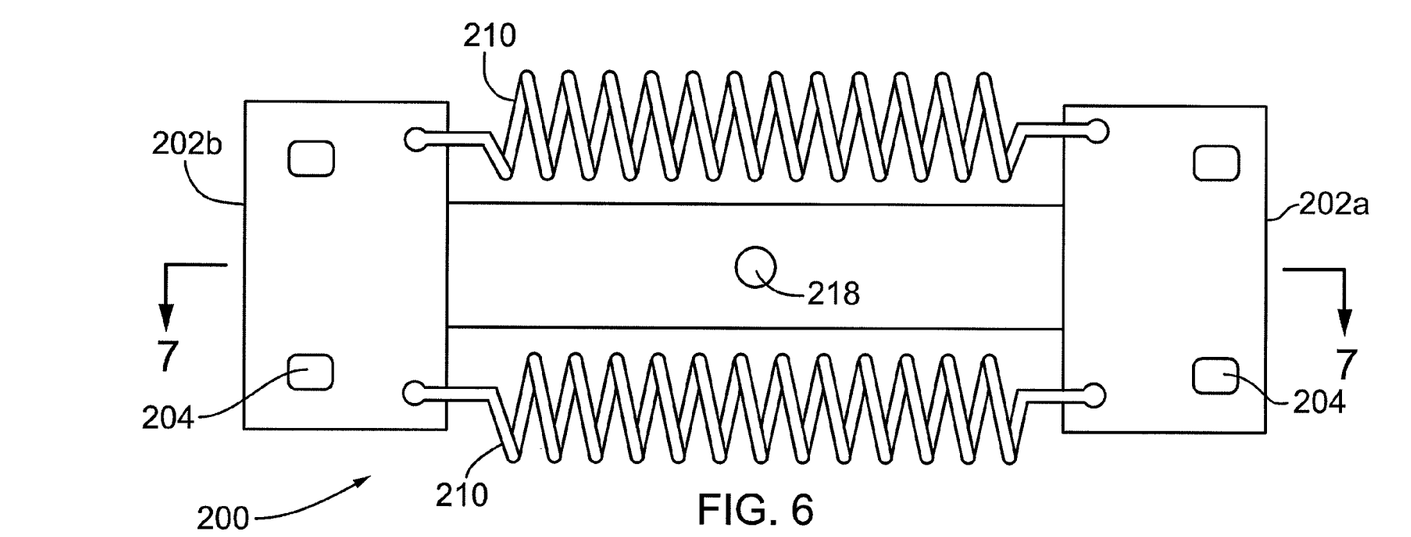
FIG. 6 is a top plan view of another embodiment of a safety device.
Figure 7:
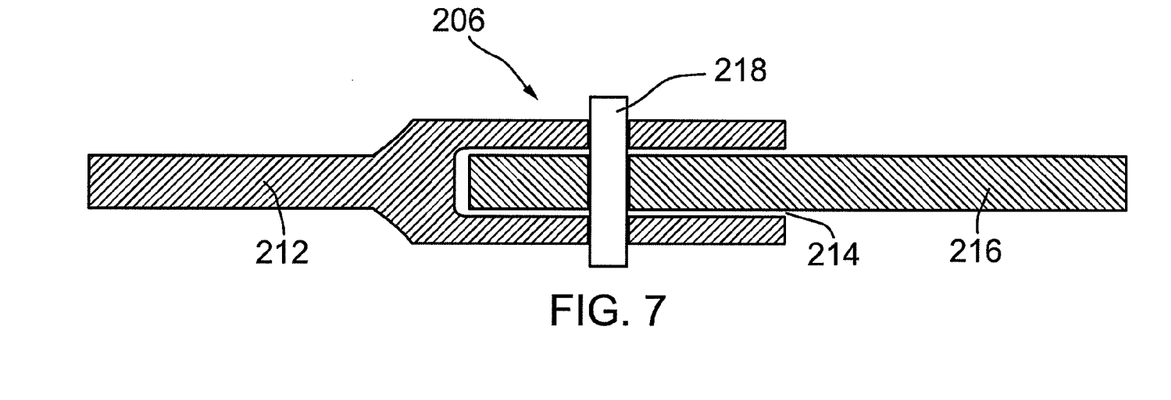
FIG. 7 is a cross-sectional view of FIG. 6 taken along line 7-7.

Turning now to FIGS. 6 and 7, another embodiment of a safety device is shown and is generally identified by reference numeral 200. In this embodiment, the safety device 200 comprises a pair of spaced bands 202a and 202b respectively, with each band having a pair of laterally spaced holes 204 provided therein. The holes 204 in band 202a accommodate fasteners that secure the band to the horizontal flange 96. The holes 204 in band 202b accommodate fasteners that secure the band to the top of the boom 86. The bands 202a and 202b are joined by a generally central mechanical fuse assembly 206. A pair of elongate coil springs 210 also joins the bands 202a and 202b. Each coil spring 210 is positioned on an opposite side of the mechanical fuse assembly 206. The mechanical fuse assembly 206 comprises an arm 212 integral with the band 202b that terminates midway between the bands. The distal end of the arm 212 is configured to form a recess 214. An arm 216 integral with the band 202a terminates with its distal end accommodated in the recess 214. A shear pin 218 passes through the arms 212 and 216 and the recess 214 thereby to interconnect and retain the arms and inhibit their separation.

Similar to the previous embodiment, during normal loading the integrity of the safety device 200 remains intact keeping the boom 86 in its generally horizontal orientation. However, if the boom 86 is overloaded as a result of one or more individuals pulling down on or hanging from the boom, when the load placed on the boom 86 reaches the threshold, the shear pin 218 fails thereby to allow the arms 210 and 214 to separate and permit the boom 86 to pivot downwardly. The point at which the shear pin 218 fails is selected to avoid damage to the wall surface 78 from occurring as a result of the mounting bracket 84 being pulled from the wall surface. During downward swinging of the boom 86 under continued application of the applied load and/or under its own weight, the springs 210 extend thereby resisting downward pivoting of the boom 86 and controlling the descent of the boom 86 in a manner to avoid injury to anyone and/or damage to anything beneath the boom 86 as well as to avoid damage to the projector 88 and the mirror 89 supported by the boom 86. As with the embodiment of FIGS. 1 to 5, the number and arrangement of mechanical fuse assemblies and coil springs 210 can be varied.

Figure 8:
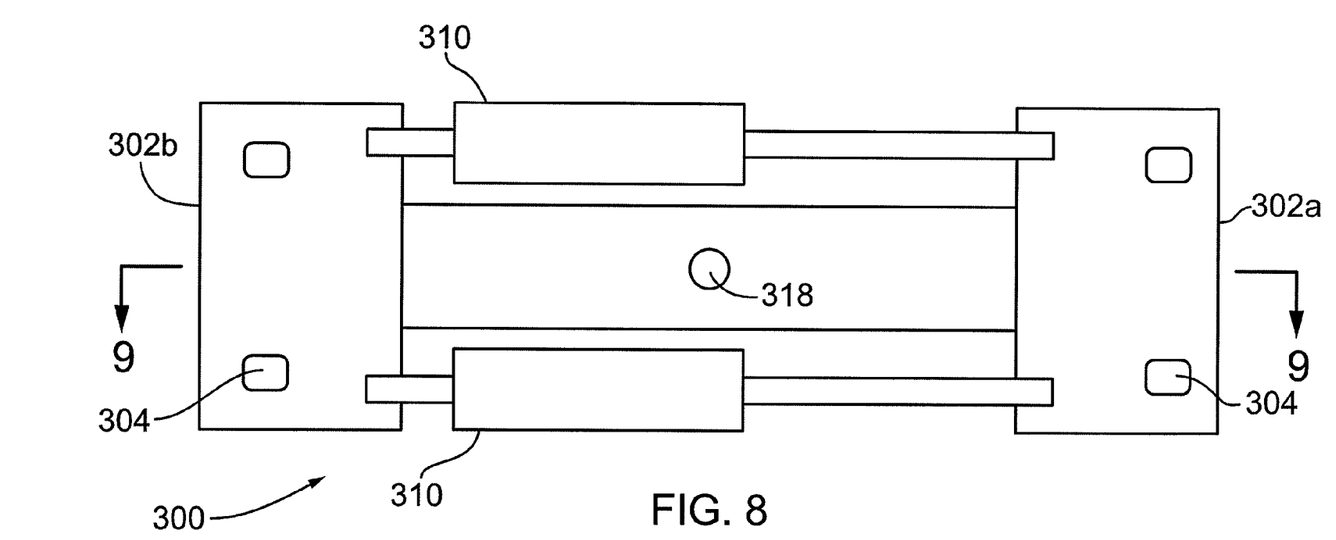
FIG. 8 is a top plan view of yet another embodiment of a safety device.
Figure 9:
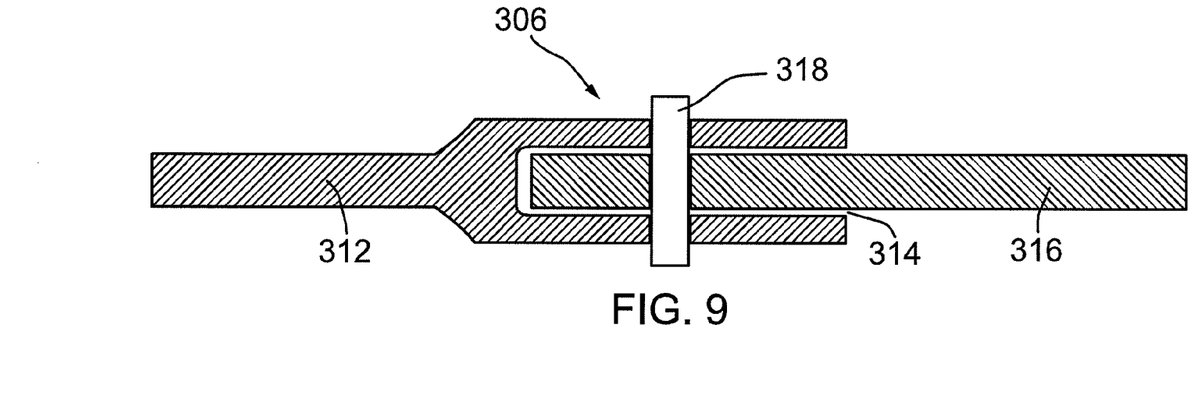
FIG. 9 is a cross-sectional view of FIG. 8 taken along line 9-9.

Turning now to FIGS. 8 and 9, yet another embodiment of a safety device is shown and is generally identified by reference numeral 300. The safety device 300 in this embodiment is very similar to that shown in FIGS. 6 and 7. As can be seen, the safety device 300 comprises a pair of spaced bands 302a and 302b respectively, with each band having a pair of laterally spaced holes 304 provided therein. The holes 304 in band 302a accommodate fasteners that secure the band to the horizontal flange 96. The holes 304 in band 302b accommodate fasteners that secure the band to the top of the boom 86. The bands 302a and 302b are joined by a central mechanical fuse assembly 306. A pair of dashpots 310 (i.e. pneumatic or hydraulic cylinder and piston arrangements) also joins the bands 302a and 302b. Each dashpot 310 is positioned on an opposite side of the central mechanical fuse assembly 306. The mechanical fuse assembly comprises an arm 312 integral with the band 302b that terminates midway between the bands. The distal end of the arm 312 is configured to form a recess 314. An arm 316 integral with the band 302a terminates with its distal end accommodated in the recess 314. A shear pin 318 passes through the arms 312 and 316 and the recess 314 thereby to interconnect and retain the arms and inhibit their separation. As will be appreciated, the safety device 300 functions in a manner almost identical to that of safety device 200 except that during downward swinging of the boom 86, the dashpots 310 control the descent of the boom 86.

Each of the safety devices need not carry a single type of mechanical fuse or boom-pivoting resisting element. If desired, each safety device may comprise a variety of boom-pivoting resisting elements and/or a variety of mechanical fuses. For example, the safety device may comprise one or more chain-link elements as well as one or more spring elements and/or dashpots. The safety device may also comprise one or more elongated links and one or more mechanical fuse assemblies.

Figure 10:
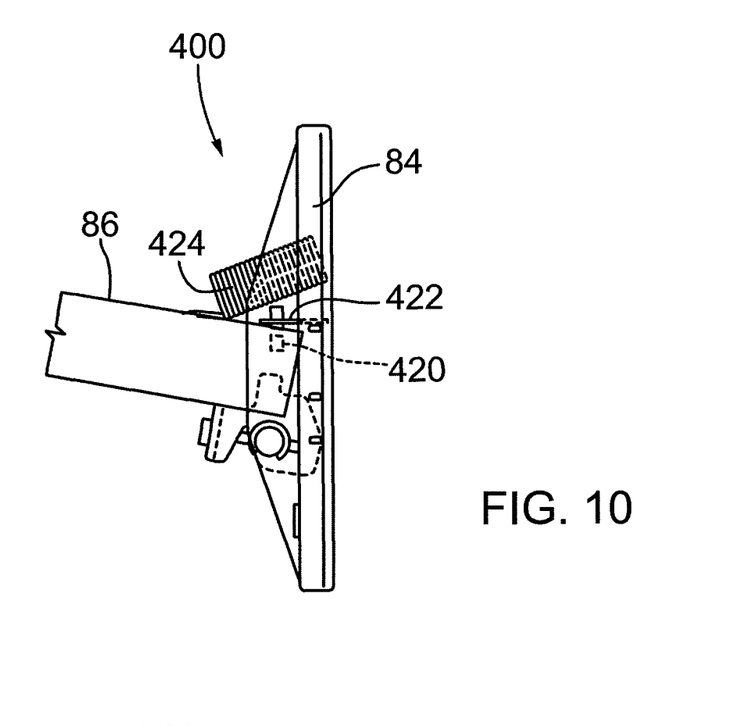
FIG. 10 is a side elevational view of a portion of the boom assembly showing yet another embodiment of a safety device.

Turning now to FIG. 10 yet another embodiment of a safety device is shown and is generally identified by reference numeral 400. In this embodiment, the safety device 400 comprises a shear pin 420 extending upwardly from the top surface of the boom 86 adjacent the mounting bracket 84. A retainer 422 in the form of a triangular ring extends from the mounting bracket 84 and surrounds the shear pin 422. A coil spring 424 is secured at one end to the mounting bracket 84 and at its opposite end to the top surface of the boom 86. Similar to the embodiment of FIGS. 6 and 7, during normal loading, the shear pin 420 remains intact thereby trapping the retainer 422 and keeping the boom 86 in its generally horizontal orientation. However, if the boom 86 is overloaded, when the load placed on the boom reaches the threshold, the shear pin 420 fails thereby releasing the retainer 422 and permitting the boom 86 to pivot downwardly. During the downward swinging of the boom 86, the coil spring 424 controls the descent of the boom 86.

Figure 11:
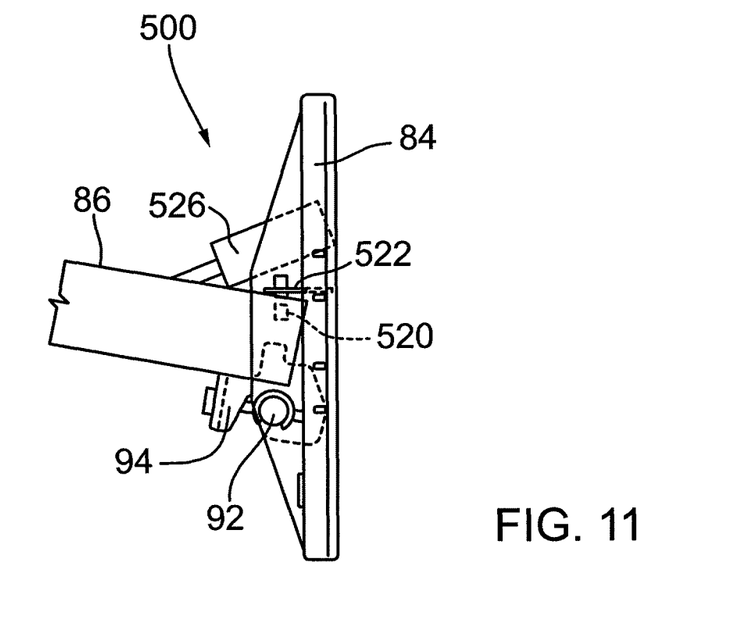
FIG. 11 is a side elevational view of a portion of the boom assembly showing yet another embodiment of a safety device.

FIG. 11 shows still yet another embodiment of a safety device 500. In this embodiment, the safety device 500 is very similar to that shown in FIG. 10. As can be seen, the safety device 500 comprises a shear pin 520 extending upwardly from the top surface of the boom 86 adjacent the mounting bracket 84. A retainer 522 in the form of a triangular ring extends from the mounting bracket 84 and surrounds the shear pin 520. A dashpot 524 is secured at one end to the mounting bracket 84 and at its opposite end to the top surface of the boom 86. As will be appreciated, the safety device 500 functions almost identical to that of safety device 400 except during downward swinging of the boom 86, the dashpot 524 controls the descent of the boom.

Figure 12:
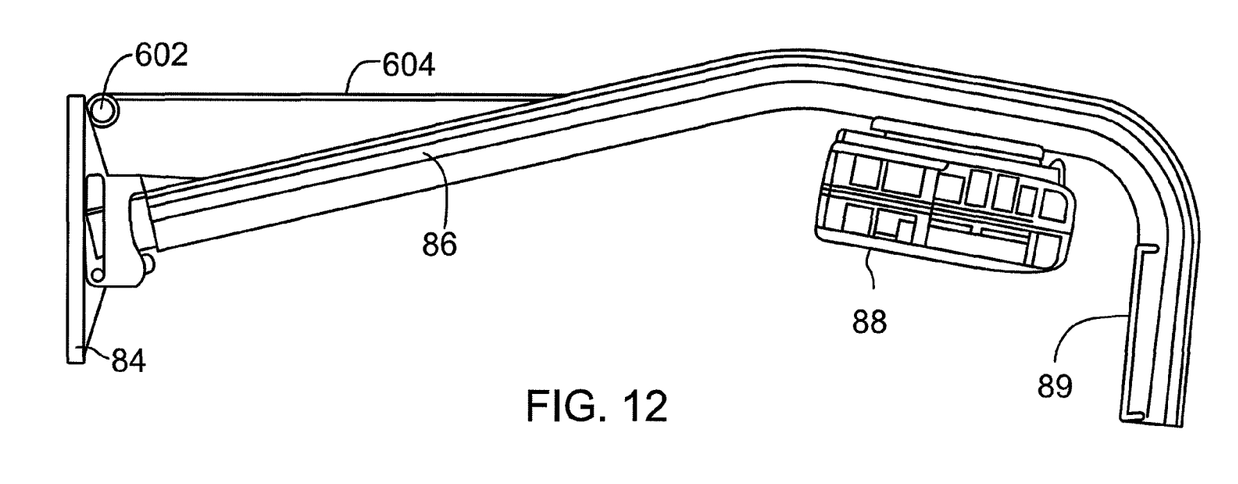
FIG. 12 is a side elevational view of the boom assembly showing still yet another embodiment of a safety device.
Figure 13:
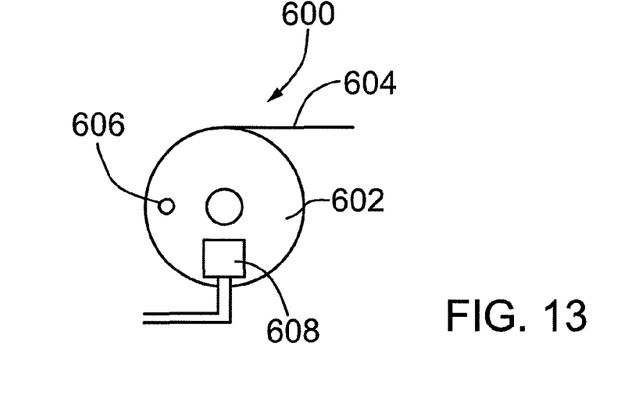
FIG. 13 is an enlarged, side elevational view of the safety device shown in FIG. 12.

Turning now to FIGS. 12 and 13 still yet another embodiment of a safety device is shown and is generally identified by reference numeral 600. In this embodiment, the safety device comprises a spool 602 rotatably mounted on the mounting bracket 84. A tether 604 is wound about the spool 602 and is attached at its free end to the boom 86. A retaining pin 606 extends through the spool 602 thereby to inhibit rotation of the spool and hence, paying out of the tether 604. A brake 608 exerts force on the spool 602.

In operation, during normal loading the integrity of the retaining pin 606 remains intact thereby locking the spool 602 and tether 604 and keeping the boom 86 in its generally horizontal orientation. However, if the boom 86 is overloaded, the retaining pin 606 fails allowing the spool 602 to rotate and pay out the tether 604 thereby permitting the boom 86 to pivot downwardly. During the downward pivoting of the boom 86, the brake 608, which exerts a force on the spool 602, resists the downward pivoting of the boom 86 thereby to control the descent of the boom.

Those of skill in the art will appreciate that use of the safety device is not limited to a boom assembly 82 supporting a projector 88 and mirror 89. Other equipment such as for example camera assemblies, mirrors, microphones etc. may be supported by the boom assembly. In fact, the safety device may be used in virtually any environment where a cantilevered beam may be subjected to overloading.

Although embodiments have been described, those of skill in the art will appreciate that variations and modifications may be made without departing from the spirit and scope thereof as defined by the appended claims.

What is claimed is:

1. A safety device for a cantilevered beam, said cantilevered beam pivotally mounted adjacent one end thereof to a support surface, said safety device being adapted to bridge said beam and said support surface and being structured so that when coupled to said beam and support surface, said safety device maintains said beam in a substantially fixed cantilevered condition until a downward force exceeding a threshold is applied to said beam and thereafter controls downward pivoting of said beam, wherein said safety device is a metal strap comprising first structure in the form of at least one elongate link to maintain said beam in said substantially fixed cantilevered condition and second structure comprising at least one beam-pivoting resisting element that comprises at least one chain-link element to control downward pivoting of said beam, wherein said at least one elongate link has a region of weakness formed along its length and wherein said region of weakness is a region of reduced dimension and wherein said at least one elongate link breaks when a downward force exceeding said threshold is applied to said beam.

2. A safety device according to claim 1 comprising a plurality of beam-pivoting resisting elements.

3. A safety device according to claim 1 further comprising a plurality of elongate links.

4. A safety device according to claim 1 wherein said beam-pivoting resistive elements and said at least one elongate link are positioned side-by-side and in parallel.

5. A safety device according to claim 4 wherein said at least one elongate link is positioned between said beam-pivoting resistive elements.

6. A safety device for a cantilevered beam, said cantilevered beam pivotally mounted adjacent one end thereof to a support surface, said safety device being adapted to bridge said beam and said support surface and being structured so that when coupled to said beam and support surface, said safety device maintains said beam in a substantially fixed cantilevered condition until a downward force exceeding a threshold is applied to said beam and thereafter controls downward pivoting of said beam, wherein said safety device is a metal strap comprising first structure to maintain said beam in said substantially fixed cantilevered condition and second structure to control downward pivoting of said beam, wherein said first structure is at least one elongate link and said second structure is at least one beam-pivoting resisting element, said at least one beam-pivoting resisting element comprising at least one chain-link element.

7. A safety device according to claim 6 comprising a plurality of beam-pivoting resisting elements.

8. A safety device according to claim 7 wherein said beam-pivoting resistive elements and said at least one elongate link are positioned side-by-side and in parallel.

9. A safety device according to claim 8 wherein said at least one elongate link is positioned between said beam-pivoting resistive elements.

10. A boom assembly comprising:
   a boom pivotally coupled adjacent one end thereof to a support surface;
   a safety device acting between said boom and said support surface, said safety device maintaining said boom in a substantially horizontal orientation but failing when a downward force exceeding a threshold is applied to said boom to permit said boom to pivot downwardly, after failure said safety device controlling downward pivoting of said boom, wherein said safety device is a metal strap comprising first structure coupling said boom and support surface that is physically altered when said boom is subjected to said downward force exceeding said threshold and second structure coupling said boom and support surface that controls downward pivoting of said boom, wherein said first structure comprises at least one elongate link having a region of weakness thereon and wherein said second structure comprises at least one beam-pivoting resisting element that comprises at least one chain-link element; and
   a mounting bracket to which the one end of said boom is pivotally coupled, said mounting bracket being fastened to said support surface, wherein said strap is fastened adjacent one end thereof to said boom and adjacent an opposite end thereof to said mounting bracket.

11. A boom assembly according to claim 10 wherein said first structure breaks when subjected to the downward force exceeding said threshold.

12. A boom assembly according to claim 10 comprising a plurality of beam-pivoting resisting elements.

13. A boom assembly according to claim 12 wherein said beam-pivoting resistive elements and said at least one elongate link are positioned side-by-side and in parallel.

14. A boom assembly according to claim 13 wherein said at least one elongate link is positioned between said beam-pivoting resistive elements.

15. A boom assembly according to claim 10 wherein said strap is fastened to said boom and mounting bracket at locations proximate the pivotal connection of said boom to said mounting bracket.

16. A safety device for a cantilevered beam, said cantilevered beam pivotally mounted adjacent one end thereof to a support surface, said safety device being configured to bridge said beam and said support surface, said safety device comprising at least one elongate link to maintain said beam in a substantially fixed cantilevered condition until a downward force exceeding a threshold is applied to said beam and at least one elongate chain-link element to control downward pivoting of said beam after said downward force exceeding said threshold has been applied to said beam, wherein said at least one elongate link stretches to a point of non-recovery when said downward force exceeding said threshold is applied to said beam, wherein said safety device is a metal strap comprising said at least one elongate link and said at least one chain-link element.

17. A safety device according to claim 16 comprising a plurality of chain-link elements.

18. A safety device according to claim 17 wherein said chain-link elements and said at least one elongate link are positioned side-by-side and in parallel.

19. A safety device according to claim 18 wherein said at least one elongate link is positioned between said chain-link elements.

20. A safety device according to claim 16 further comprising a plurality of elongate links.

* * * * *